(12) United States Patent
Attie et al.

(10) Patent No.: US 8,517,228 B2
(45) Date of Patent: Aug. 27, 2013

(54) DISPENSING CAP FOR A CONTAINER

(75) Inventors: Jorge Luiz Attie, Sao Paulo (BR);
Marcus Vinicius Gasparotto, Sao Paulo (BR)

(73) Assignee: Arch Chemicals, Inc., Atlanta, GA (US)

( * ) Notice: Subject to any disclaimer, the term of this patent is extended or adjusted under 35 U.S.C. 154(b) by 0 days.

(21) Appl. No.: 13/390,256

(22) PCT Filed: Jun. 24, 2010

(86) PCT No.: PCT/US2010/039738
§ 371 (c)(1),
(2), (4) Date: Jul. 23, 2012

(87) PCT Pub. No.: WO2011/022118
PCT Pub. Date: Feb. 24, 2011

(65) Prior Publication Data
US 2012/0280000 A1 Nov. 8, 2012

(30) Foreign Application Priority Data
Aug. 19, 2009 (BR) .................................. 0902553

(51) Int. Cl.
*G01F 11/28* (2006.01)

(52) U.S. Cl.
USPC ........... 222/452; 222/370; 222/450; 222/483; 222/548; 222/566

(58) Field of Classification Search
USPC ................. 222/478, 481–484, 526, 531–533, 222/536–537, 544, 566, 450–452, 562, 370, 222/365–368, 426, 430, 344, 548
See application file for complete search history.

(56) References Cited

U.S. PATENT DOCUMENTS

| 928,052 | A | | 7/1909 | Hirsch |
| 2,898,010 | A | | 8/1959 | Tepper |
| 3,327,905 | A | | 6/1967 | Gould |
| 3,730,387 | A | * | 5/1973 | McConnell et al. .......... 221/265 |
| 4,345,700 | A | * | 8/1982 | Souza ........................... 222/438 |
| 4,691,821 | A | | 9/1987 | Hofmann |

(Continued)

FOREIGN PATENT DOCUMENTS
EP 0787979 A1 8/1997

OTHER PUBLICATIONS

International Search Report, dated Aug. 30, 2010, issued in priority International Application No. PCT/US2010/039738.

(Continued)

*Primary Examiner* — Frederick C Nicolas
(74) *Attorney, Agent, or Firm* — Dority & Manning, PA

(57) ABSTRACT

A cap is attached to a container using a device with first and second disks mounted on opposite ends of a shaft, each disk having an opening. A cover cup is rotatably mounted on the shaft. When the container is inverted, rotation of the cover cup to a first position provokes alignment of the opening of an interior wall of the cover cup with the opening of the first disk, permitting material to flow from the container to the interior of the cover cup, and a subsequent rotation of the cover cup to a second position aligns the opening of the second disk with the opening of an end wall of the cover cup, to permit dispensing the material from the cover cup to a place of use.

12 Claims, 4 Drawing Sheets

(56) References Cited

U.S. PATENT DOCUMENTS

| | | | |
|---|---|---|---|
| 5,044,527 A | 9/1991 | Hickerson | |
| 5,495,962 A * | 3/1996 | Nomura | 222/80 |
| 5,676,282 A * | 10/1997 | Satterfield | 222/307 |
| 6,283,339 B1 | 9/2001 | Morrow | |
| 6,412,670 B1 * | 7/2002 | Randmae et al. | 222/452 |
| 6,550,640 B2 * | 4/2003 | Smith | 222/1 |
| 7,451,901 B2 * | 11/2008 | Ranney | 222/438 |

OTHER PUBLICATIONS

Supplementary European Search Report dated Jan. 7, 2013, in corresponding Application No. PCT/US2010/039738.

* cited by examiner

DISPENSING CAP FOR A CONTAINER

FIELD OF THE INVENTION

The present invention relates to a cap for dispensing a measured amount of material from a container, without having to remove the cap from the container.

BACKGROUND OF THE INVENTION

Many materials are provided to users in a large volume contained in containers and the user is compelled to dispense a certain amount of the material from the container. As a typical example of said situation, it can be cited a liquid, such as a detergent for washing a load of clothes in a washing machine or for washing a load of dishes in a dishwasher, which liquid is presented to the users in a container that holds a substantial volume of the liquid. The user is thus compelled to dispense a certain reasonably precise amount of said liquid from the container to wash a load of clothes or dishes. Dispensing of the liquid from the container can be accomplished in various ways.

In one way, the user can first unscrew the container sealing cap and pour the liquid from the container into a measuring cup or spoon to obtain the desired amount. The liquid is then transferred from the cup or spoon to the clothes washing machine or dishwasher. The user then screws the cap back onto the container.

In another way, the sealing cap itself serves as a measuring instrument by being constructed to hold the desired amount of liquid. In this case, the user unscrews the cap from the container, dispenses the liquid into the cap, transfers the liquid from the cap to the machine and, finally, screws the cap back onto the container.

While the ways of transferring material from the container into the washing machine or other place of use for the material are reasonably easy to accomplish, they can give rise to several annoyances. For example, the user might over fill the measuring cup or spoon or even the cap itself when it serves as the measuring instrument. This not only causes a waste of material, but the user will have to clean up the over fill amount. Also, material can be unduly spilled as it is being transferred from the measuring cup or spoon or from the adequately dimensioned cap to the place of use. Further, there is always the risk that a container with the cap removed accidentally will be pushed off from its resting position, allowing the material to be spilled out from the container. This wastes the material and also presents a disagreeable clean up problem.

Accordingly, a need exists for an arrangement by which a measured amount of material in a container can be transferred directly from the container to a place of use, such as a dishwasher or clothes washing machine, without having to remove the cap from the container.

SUMMARY OF THE INVENTION

A container cap is provided that is capable of transferring material directly from the container to the place of use, without having to remove the container cap. The present cap has two main components. The first component is an outer cover cup in the form of a conventional cap. The cover cup has a distal, or top, end wall and a proximal wall across the interior of the cover cup, disposed in the interior of the cap and adjacent to the end wall close to the proximal end of the cover cup. The terms "proximal" and "distal" define relative positions in relation to the top opening of the container to which the cap is applied. A pair of aligned openings is formed, each opening being formed in one of the proximal and distal walls of the cover cup.

The cover cup is rotatably mounted on the second cap component, which is a dual function device that fixedly holds the cap to the container and also controls dispensing or pouring of the material from the container to the place of use, as the cover cup is rotated to various positions relative to the dual function device that is fixedly mounted to the container. The dual function device has a disk at each end of a shaft and the cover cup is rotatably mounted to the shaft, with one disk being adjacent to each of the distal and proximal walls of the cover cup. An annular rim extends from the proximal disk of the dual function device and is located externally to the cap and presents slots that are used to fasten the cap to the container. Each of the device disks has an opening, with the openings of the two disks being angularly offset from each other relative to the shaft axis of the device.

Upon operation of the cap, the container to which it is fixed is inverted, with the distal end wall of the cover cup turned downwardly and preferably located over the place of use, where material from the container is to be dispensed. At this time, the cover cup is in its closed position, none of the openings of the cover cup and of the device disks being aligned. Therefore, the container opening is sealed and no material can be released therefrom. The cover cup is then rotated with respect to the device disks, to first and second operating positions, in order to bring different openings of the cover cup and disks into and out of alignment. Dispensing of material from the container into the interior of the cover cup is controlled by rotating the cover cup to its first operating position to align the opening in the proximal inner wall of the cover cup with the opening of the proximal disk. With the container being inverted, this permits material from the container to flow into the interior of the cover cup. The cover cup is then rotated to a second operating position which aligns the openings of the distal end wall of the cover cup with the opening of the disk at the distal end of the device shaft. This permits the material within the cover cup to be dispensed from the interior of the cap to the ambient, that is, to the place of use.

It should be noted that the cap operates so that only the material admitted in the interior of the cover cup is dispensed to the place of use. Accordingly, the material is dispensed from the container in a controlled fashion. The maximum amount of material dispensed in one operation is determined by the fillable volume in the cover cup of the cap. Moving the cover cup more quickly between its closed position and the first operating position can fill the cover cup with less than a full volume, so that lesser amounts of the material can be taken from the container and dispensed to the place of use. The present cap solves the problems of overfill of the measuring instrument and material spilling from the container if it is inadvertently displaced from its resting position.

BRIEF DESCRIPTION OF THE DRAWINGS

Other objects and advantages of the present invention will become more apparent, upon reference to the following description and annexed drawings, in which.

DETAILED DESCRIPTION

Figure 1:
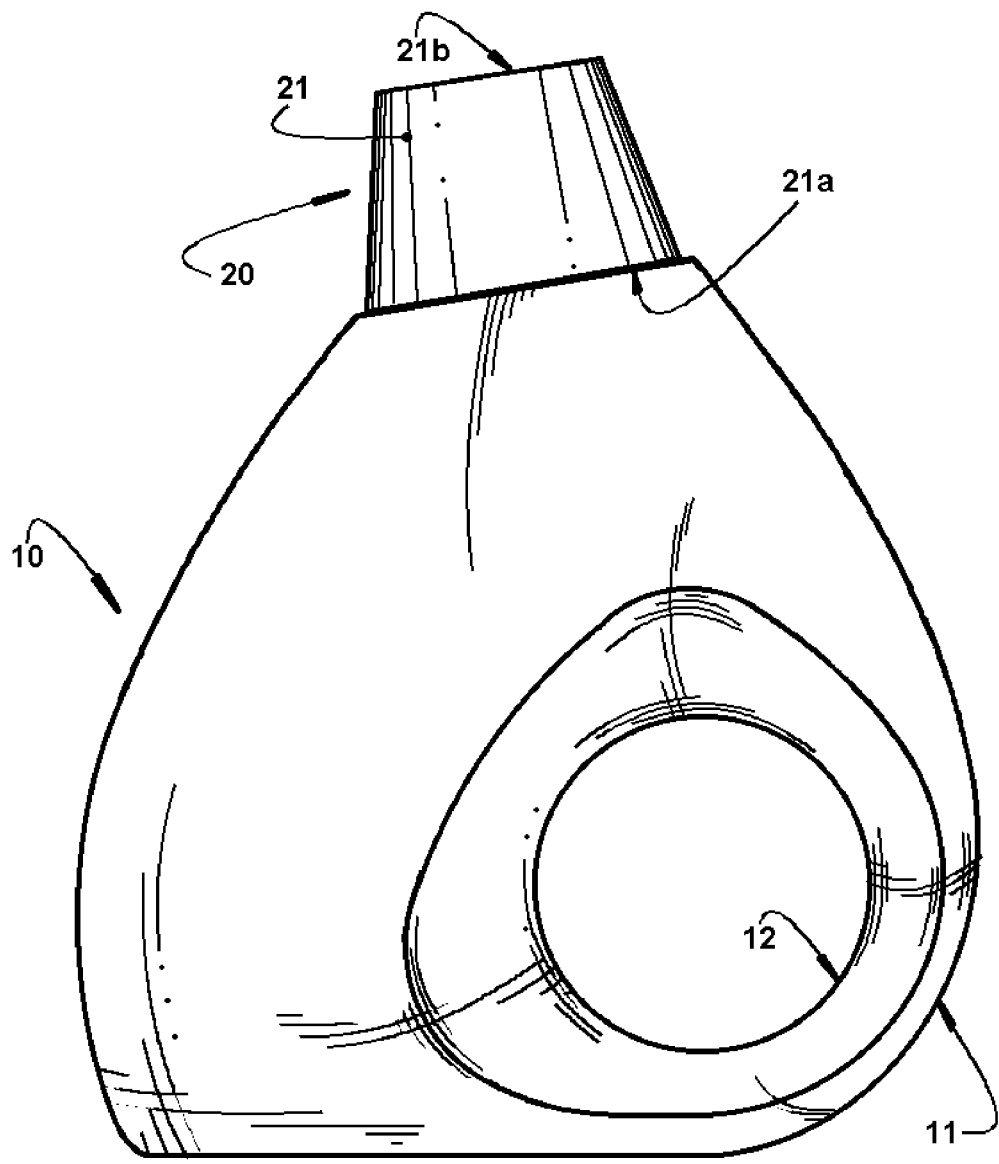
FIG. 1 is a lateral elevation view of the device with a cap attached thereon.

FIG. 1 shows a container 10 for holding a quantity of a material. The material typically is a liquid, such as a detergent to be used in a clothes washing machine or dishwasher. The material may also be a solid material, such as a powder, beads, flakes, granules, etc.

The container 10 is made of plastic material and can be made by any conventional process, such as blow molding. It has a handle 11 which defines an opening 12 into which the user's hand fits as he grasps the handle. The handle 11 preferably is round and disposed close to the bottom of the container, so as to make it easier the gripping by the user. The open top end of the container is closed by a cap 20 that has a cover cap 21 that is accessible to the user. The cover cup 21 is generally frusto-conical in shape. It tapers from a wider proximal end 21a, which is attached to the container to seal its opening, to a distal end 21b of lesser diameter.

Figure 2:
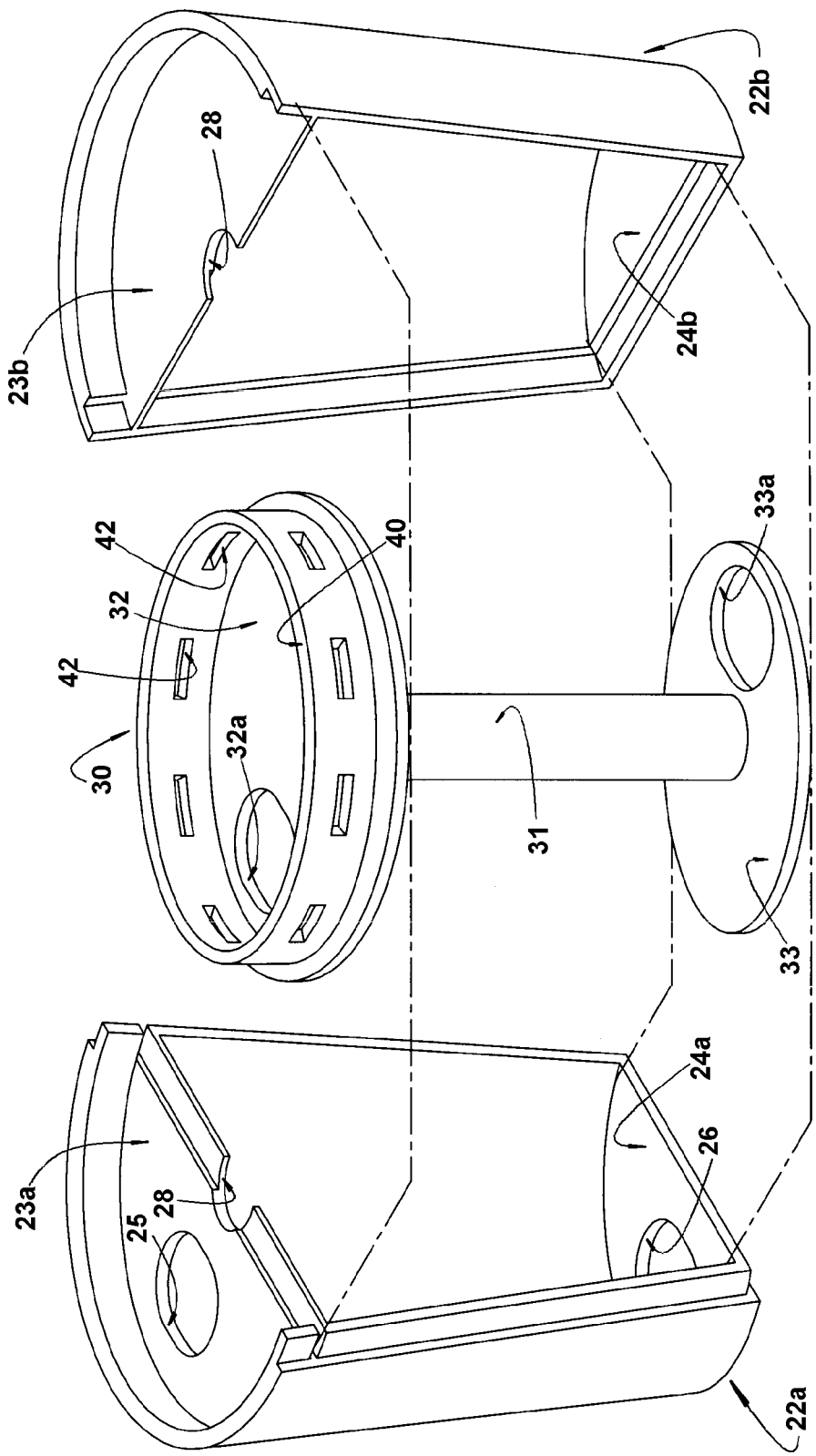
FIG. 2 is an exploded perspective view of the cap showing its components.
Figure 3:
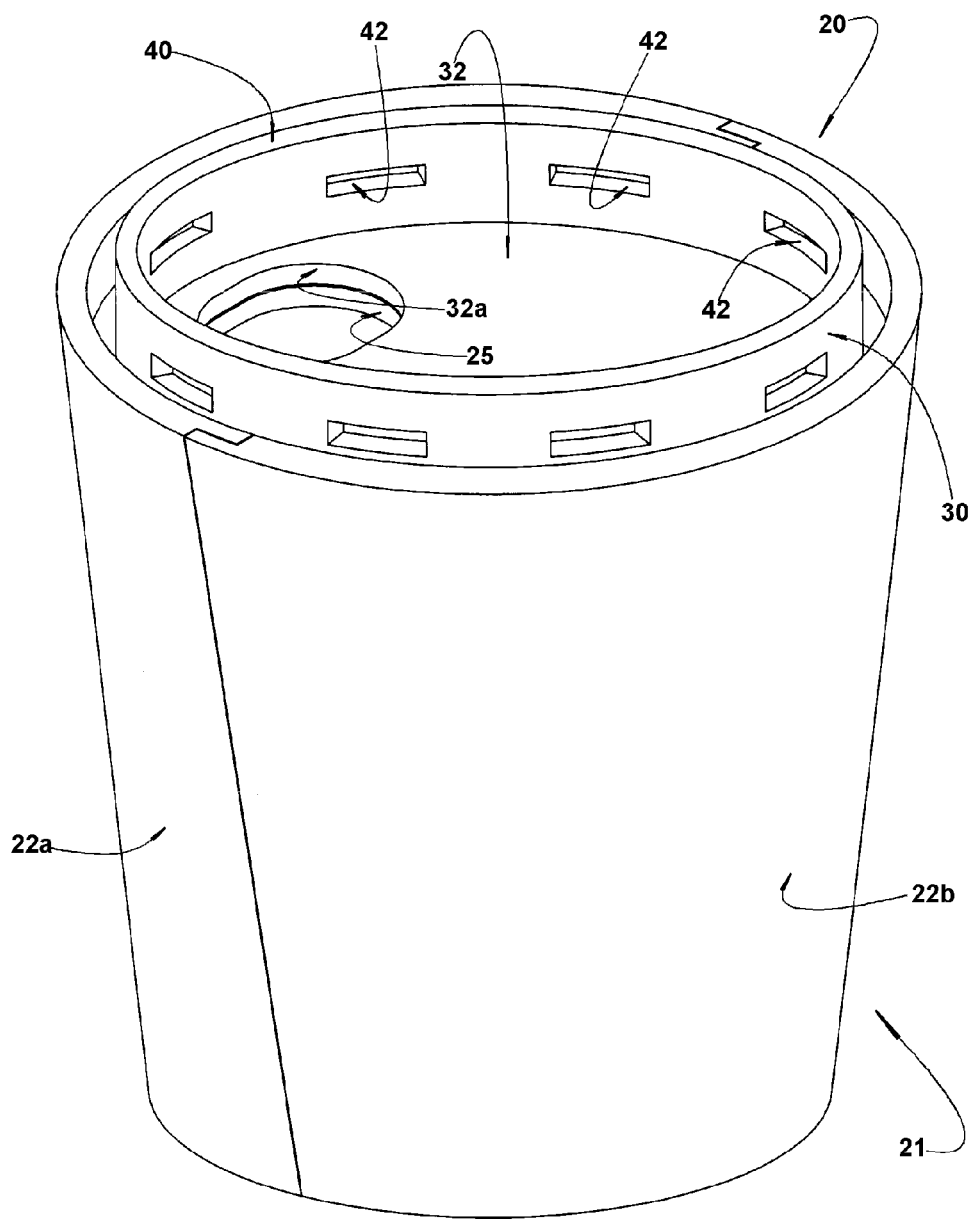
FIG. 3 is an overall perspective view of the cap.

The cap 20 has the cover cup 21 as shown in FIG. 3. For purposes of assembly of the cap, whose details are shown in FIG. 2, the cover cup 21 is formed in two sections, preferably in the form of half sections 22a and 22b. The cover cup sections 22a and 22b are preferably of a suitable plastic material and are joined together by any suitable process, for example, heat sealing or gluing. A wall part 23a and 23b, each being of a generally semi-circular shape, is provided in each cover cup section 22a, 22b near the proximal end 21a of the cover cup 21. The terms "proximal" and "distal" are used in describing orientation of the cap relative to the container, these terms being preferable to "upper" and "lower", since the cap is generally provided at the upper end of the container, but the container is held upside down during the dispensing operation of the material.

Similarly, a respective semi-circular wall part 24a and 24b is provided at the distal end 21b of the cover cup 21. When the two cover cup sections 22a and 22b are joined together, there will be formed a full proximal wall 23 across the interior of the cover cup 21 and a full distal wall 24 which will form the distal end 21b of the cap 20.

Figure 4:
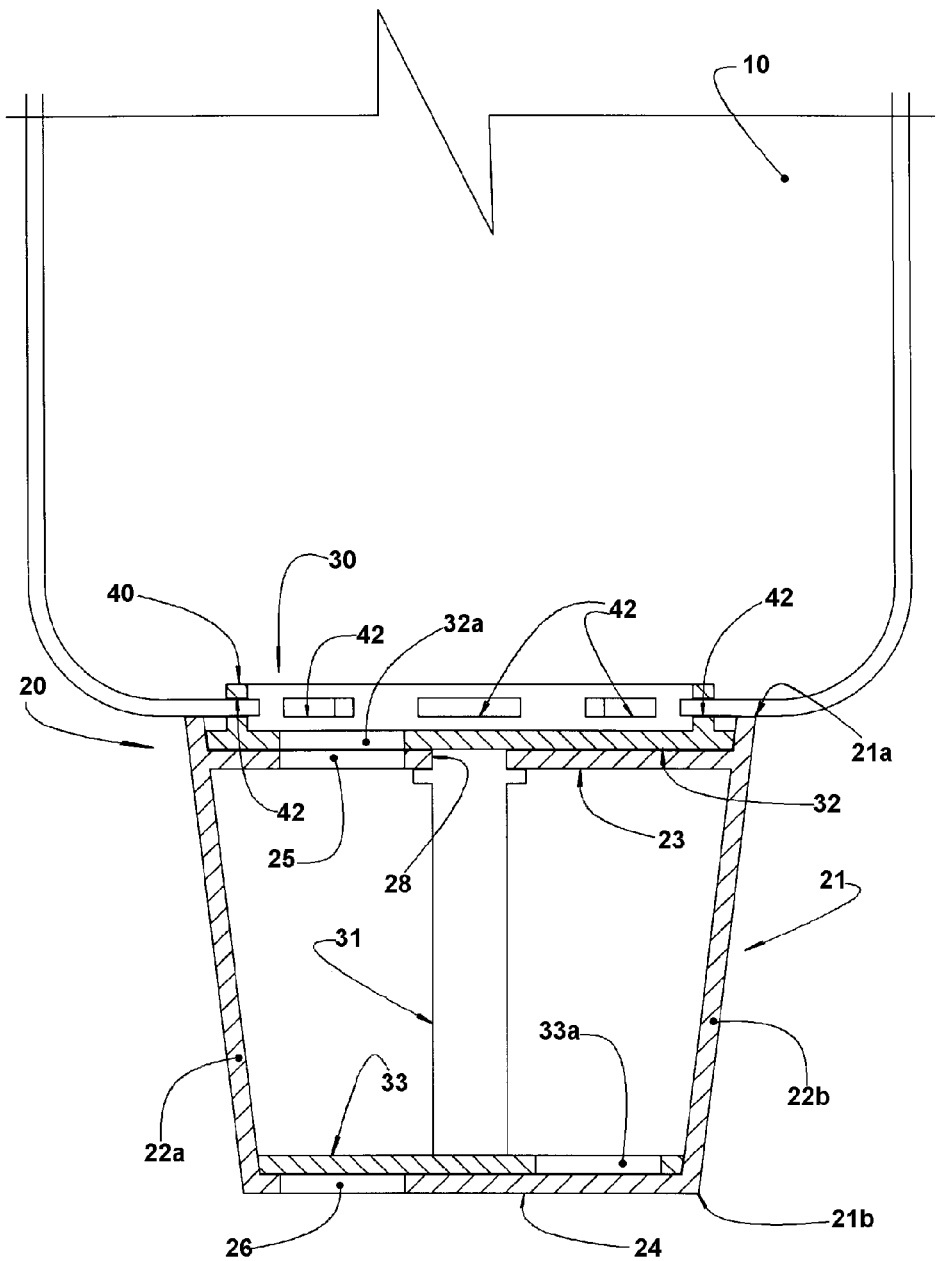
FIG. 4 is a partial cross section view of the container and of the device which maintains the cap fixedly retained to the container, the cover cup being in its first operational position, in which the material is allowed to flow gravitationally from the interior of the container to the interior of the cap.

Each of the proximal wall parts 23a and 23b of the cover cup sections 22a and 22b has a semi-circular opening or cutout 28 at the center of the elongated edge of the wall part. When the two sections 22a, 22b of the cover cup 21 are joined together, the openings 28 form a circular wall that will be fitted around a shaft, in a manner to allow the cover cup 21 to rotate about the shaft. A respective opening 25 and 26 is formed in the proximal and distal walls 23 and 24 of the cover cup 21. The openings 25 and 26 are vertically aligned (see FIG. 4).

The cap 20 also has a dual function device 30 having a part that fixedly attaches the cap 20 to the container 10 and parts that cooperate with the openings 25, 26 in the proximal and distal walls 23, 24 of the cover cup 21, to control the dispensing of material from the container 10 to the interior of the cover cup 21 and then to the place of use, upon rotation of the cover cup 21. The dual function device 30 is also preferably made of molded plastic material and presents a central shaft 31, around which the openings (semi-circular cutouts) 28 of the proximal wall sections 23a and 23b of the cover cup 21 are fitted. A first circular disk 32 is mounted on the proximal end of shaft 31 (relative to the cap 20 being fastened to the container 10) and a second circular disk 33 is mounted on the distal end of the shaft 31.

A respective opening 32a and 33a is provided in the disks 32 and 33 of the device 30. Each of the openings 32a and 33a is offset from the center of its disk. The openings 32a and 33a are also angularly offset from each other by about 180° relative to the shaft 31, but it should be understood that any other suitable angle can be selected. Material from the interior of the container may be dispensed into the interior of cover cup 21 when it is rotated about the shaft 31 of the device 30, to a position in which the opening 25 of the proximal wall 23 of the cover cup 21 is aligned with the opening 32a of the proximal disk 32. This alignment is shown in FIG. 3. The material loaded into the interior of the cover cup 21 is dispensed to the exterior place of use when the cover cup 21 is rotated to align the distal end opening 26 of the cover cup 21 with the opening 33a of the disc 33.

An annular rim 40 is formed around the circumference of the proximal disk 32 of the device 30 and extends outwardly of the cover cup 21. The rim 40 has a plurality of slots 42 around its circumference. In an embodiment, as shown in FIGS. 2 and 3, the slots 42 fit on tabs (not shown) incorporated in a single piece with the container 10, along the opening thereof, to fixedly fasten the cap 20 to the container 10. In this embodiment, the fastening can be permanent, such as by heat sealing or gluing the container tabs to the annular rim 40. Alternatively, the slots 42 and tabs may be configured as a "bayonet" fastening arrangement, to permit the cap 20 to be manually rotated and separated from the container 10.

The components of the cap 20 are assembled by bringing the two sections 22a and 22b of the cover cup 21 together, so that the proximal disk 32 of the device 30 rests on the proximal wall 23 of the cover cup 21 and the distal disk 33 of the device 30 rests on the distal wall 24 of the cover cup 21. The walls of the cover cup 21 and the disks are preferably engaged to each other to minimize leakage of the material. The semi-circular openings 28 of the wall parts 23a and 23b of the cover cup 21 fit around the shaft 31 of the device 30 and are large enough to permit the cover cup 21 to rotate about the shaft 31. The sections 22a and 22b of the cover cup 21 are moved toward each other until their edges engage and the engaging surfaces are joined together by heat sealing or an adhesive, to complete assembly of the cap 20. The edges of the sections 22a and 22b of the cover cup 21 and those of the proximal and distal wall parts 23a, 23b and 24a, 24b may have ridges and grooves which snap the sections together, providing a better foundation for joining said sections together.

In the use of the dispensing cap of the invention, the fully assembled cap 20 is attached to the open end of the container 10 by inter-fitting of the slots 42 of the annular rim 40 on the proximal disk 32 of the device 30 with the tabs (not shown) provided along the opening of the container 10. The container 10, with its cap already attached, is inverted with the distal end 21b of the cover cup 21 disposed downwardly and preferably located over the place of use, in which the material from the container 10 is to be dispensed. At this time, the cap 20 is closed, by first rotating the cover cup 21 to a position in which neither of the openings 25 and 26 of the cover cup 21 is aligned with a corresponding opening 32a and 33a of the disks 32 and 33 of the device 30. That is, the opening of the container 10 is sealed and no material can leave it. The user rotates the cover cup 21 to first and second material dispensing operating positions relative to the disks 32, 33 of the device 30 which are fixed relative to the container 10. This brings the different openings of the walls of the cover cup 21 and of the disks of the device 30 into and out of a mutual alignment.

Dispensing or releasing of material from the container 10 into the interior of the cover cup 21 is controlled by rotating the cover cup 21 to its first material dispensing operating position. This aligns the opening 25 of the proximal wall 23a of the cover cup 21 with the opening 32a of the proximal disk 32 of the device 30 (see FIGS. 3 and 4). With the container 10 being inverted, the material is allowed to exit from the container 10 and flow into the interior of the cover cup 21. The cover cup 21 is then rotated to a second material dispensing position, in which the openings 25 and 32a are moved out of alignment, so that no material from the container can enter the cover cup 21. This movement also aligns the opening 26 of the cover cup 21 with the opening 33a of the disk 33 of the device 30. This permits the material within the cover cup 21 to leave the latter and flow into the interior of the desired place of use. The user then moves the container to its upright position (not inverted) and preferably rotates the cover cup 21 to a closed position, so that no material can be dispensed. To facilitate the user rotating the cover cup 21 to the desired positions, there may be visual markings provided on the cover cup 21 and on the annular rim 40. There also may be provided a detent type arrangement provided with depressions and projections on the mating surfaces of one pair of mutually engaging walls of the cover cup 21 and of the disk 32.

It should be noted that the cap operates so that only the material of the cover cup 21 is emptied to the place of use. Accordingly, the material is dispensed from the container 10 in a controlled fashion. The maximum amount of material dispensed in one operation is determined by the fillable volume of the cover cup 21. This is determined by the overall dimensioning of the cover cup 21 and by the spacing between the disks of the dual function device 30. Moving the cover cup 21 quickly between its closed position and the first material dispensing position can fill the cover cup 21 with less material than that corresponding to its full volume, so that lesser amounts of material can be taken from the container 10 and dispensed in the place of use.

While the cap has been described as having the cover cup openings axially aligned and the disk openings angularly offset, the reverse arrangement can be used. Also, while the openings 32a, 33a and 25, 26 are illustratively shown as being circular, they can be of any desired shape, such as, for example, having an elliptical contour.

Specific features of the invention are shown in one or more of the drawings for convenience only, as each feature may be combined with other features. Alternative embodiments, including obvious changes and various modifications, will be recognized by those skilled in the art and are intended to be included within the scope of the claims. Accordingly, the above description should be construed as illustrating and not limiting the scope of the claims that accompany the present specification.

The invention claimed is:

1. A dispensing cap for a container comprising:
a dispensing control device mounted over an opening of the container; and
a cover cup mounted on said device having a distal end wall, a proximal end wall, a first pair of openings and a second pair of openings, wherein first openings from the first and second pairs of openings being position on the distal end wall and second openings from the first and second pairs of openings being position on the proximal end wall, wherein the first and second openings of the first and second pairs being spaced apart along a longitudinal axis of said cover cup;
with the container being inverted with the distal end of the cover cup disposed downwardly, a rotation of the cover cup to a first position aligns the first pair of openings, to permit dispensing of material from the container into the cover cup, and the rotation of the cover cup to a second position moves said first pair of openings out of alignment and aligns the second pairs of opening to permit dispensing of the material from interior of the cover cup.

2. The cap as claimed in claim 1, said device further comprising: a shaft; and a disk mounted at each end of said shaft, each disk having formed therein one opening of said first pair of openings.

3. The cap as claimed in claim 2, wherein said cover cup has an end wall and further comprises a wall across the interior of the cover cup, each of said end wall and interior wall of said cover cup having formed therein one of the openings of said second pair of openings.

4. The cap, as claimed in claim 3, wherein said interior wall of the cover cup has a central hole which fits around the shaft of said device to rotatably mount said cover cup to said device.

5. The cap as claimed in claim 3, wherein the openings of one of said first and second pairs of openings are vertically aligned and the openings of the other pair of openings are angularly offset from each other relative to a vertical axis.

6. The cap as claimed in claim 4, further comprising an annular rim on said disk that projects outwardly of the end of the cover cup opposite said end wall of the cover cup, to attach said device to the container.

7. The cap, as claimed in claim 6, wherein said annular rim surrounds the opening of the container.

8. The cap as claimed in claim 6, wherein said disk having said annular rim overlies the surface of the interior wall of the cover cup that is most remote from said end wall of the cover cup.

9. The cap as claimed in claim 5, wherein a surface of each said end wall and interior wall of said cover cup engages a surface of one of said disks as said cover cup is rotated.

10. A dispensing cap for a container to dispense a measured amount of material from the container to a place of use, comprising:
a device mounted to the container and including a shaft and having first and second disks mounted on opposite ends of the shaft and an opening in each disk that is angularly offset from the opening of the other disk relative to a longitudinal axis of the shaft; and
an outer cover cup mounted for rotation about said shaft, said cover cup having a first wall, across an interior of said cover cup, having a first opening and an end wall with a second opening, the rotation of the cover cup to a first position aligning the first opening with the opening in the first disk, opening the container to the interior of the cover cup, while closing the cover cup to the place of use, and the rotation of the cover cup to a second position aligning the opening of the second disk with the opening of the end wall, closing the container to the interior of the cover cup and opening the cover cup to the place of use.

11. The cap as claimed in claim 10, further comprising an annular rim extending from said first disk to attach said cap to the container at the opening of the container.

12. The cap as claimed in claim 10, wherein a surface of the first wall of the cover cup engages a surface of said first disk and an inner surface of said end wall of the cover cup engages a surface of said second disk as said cover cup is rotated.

* * * * *